United States Patent
Suzuki

(10) Patent No.: US 8,018,505 B2
(45) Date of Patent: Sep. 13, 2011

(54) IMAGE-PICKUP APPARATUS

(75) Inventor: Satoshi Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 483 days.

(21) Appl. No.: 12/181,093

(22) Filed: Jul. 28, 2008

(65) Prior Publication Data
US 2009/0040328 A1 Feb. 12, 2009

(30) Foreign Application Priority Data

Aug. 9, 2007 (JP) ................................. 2007-207812
Jul. 4, 2008 (JP) ................................. 2008-175915

(51) Int. Cl.
*H04N 9/64* (2006.01)
(52) U.S. Cl. ..................... 348/245; 348/294; 348/244
(58) Field of Classification Search ............... 348/222.1, 348/243–245, 294
See application file for complete search history.

(56) References Cited

FOREIGN PATENT DOCUMENTS

JP   2002-064196 A   2/2002
JP   2005-175930 A   6/2005

*Primary Examiner* — Gevell Selby
(74) *Attorney, Agent, or Firm* — Canon USA, Inc. IP Division

(57) ABSTRACT

An image-pickup apparatus configured to perform vertical-dark-shading correction with increased precision independently of photographing conditions and/or a photographing environment is provided. The image-pickup apparatus includes an image-pickup element having an effective-pixel part including plural pixel parts which are not shielded from light and a light-shielding-pixel part including plural pixel parts shielded from light, a signal-processing unit configured to set the reference level of output signals transmitted from the effective-pixel part, and a control unit configured to switch between plural areas used to set the reference level, the areas being provided in the light-shielding-pixel part, based on the photographing conditions and/or environmental conditions.

20 Claims, 7 Drawing Sheets

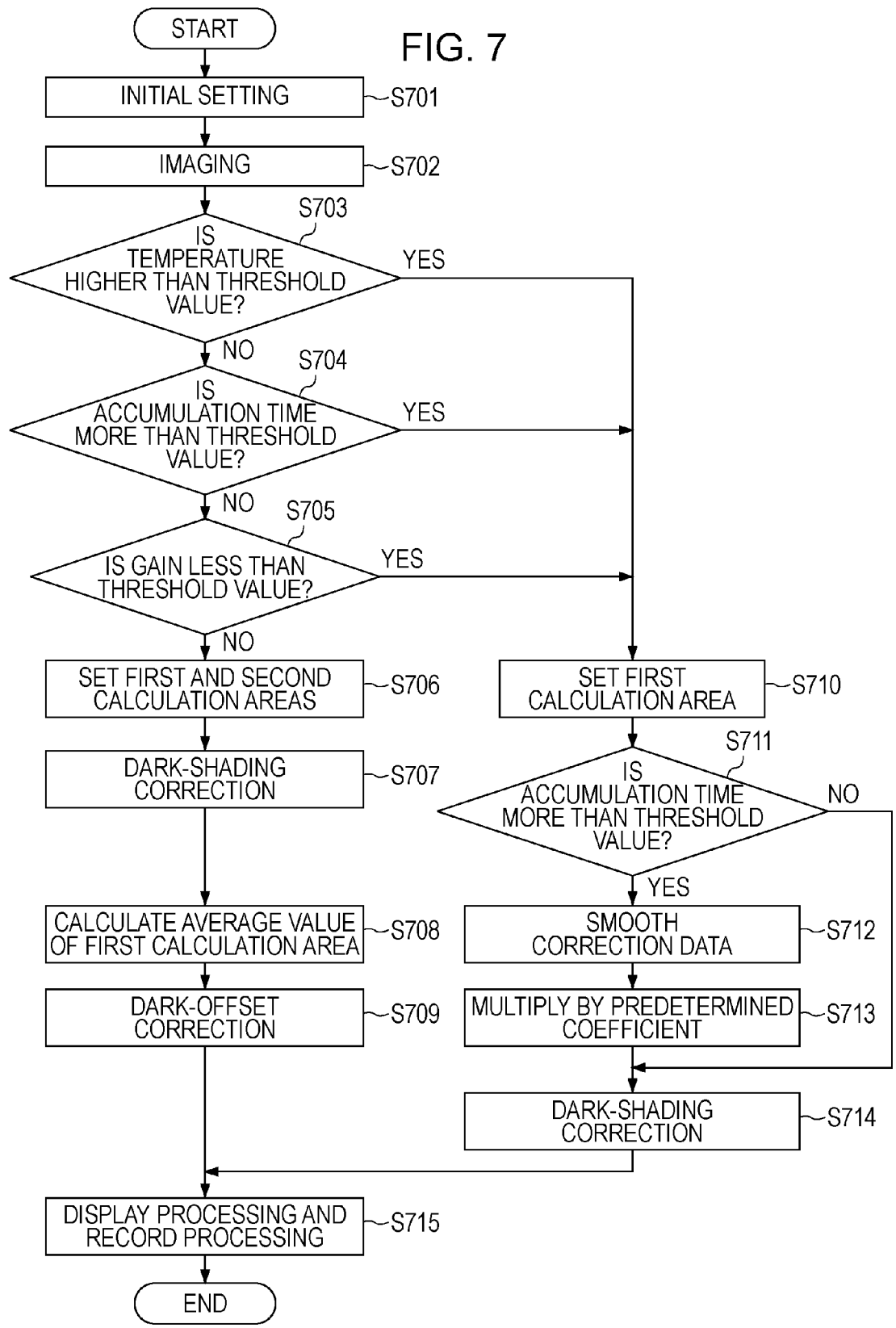

IMAGE-PICKUP APPARATUS

BACKGROUND OF THE INVENTION

1. Field of the Invention

The present invention relates to an image-pickup apparatus configured to pick up a subject image.

2. Description of the Related Art

There have been many image-pickup apparatuses such as an electronic camera configured to record and/or reproduce a still image and/or a moving image picked up through a solid-state imaging element including a charge-coupled device (CCD), a complementary-metal-oxide-semiconductor (CMOS) sensor, etc.

According to the above-described image-pickup apparatuses, an output signal often fluctuates due to the voltage fluctuation of various types of powers for supply and the result thereof often appears on an output image. When an output signal occurs, the output signal being affected by gradual voltage fluctuation occurring at intervals longer than a time period required to read the data corresponding to a single line through an image-pickup element, the level fluctuates over plural lines. Therefore, vertical shading occurs on the output image. As the intervals at which the voltage fluctuation occurs become shorter, the vertical shading occurs more frequently so that horizontal stripes occur on the image.

The pattern in which the above-described vertical shading occurs due to the voltage fluctuation is not always constant. That is to say, the form of the vertical shading occurring on an image changes with each photographing. Therefore, it has been difficult to use correction data prepared in advance.

Therefore, as disclosed in Japanese Patent Laid-Open No. 2005-175930, vertical shading of which form changes with each imaging needs to be corrected by using an output value of an optically shielded horizontal optical-black (OB) area in the image-pickup element.

For example, there has been a method of calculating the average value of output signals of each line of the horizontal-OB area and subtracting the calculated average value from an output signal of the effective-pixel area of the line in a digital-signal-processing circuit such as an image engine.

Further, there has been a method of shifting an output signal of the effective-pixel area of the line for an output signal of the image-pickup unit by using a horizontal-OB-clamping unit of an analog-signal-processing circuit so that the average value of output signals of a horizontal-OB area of each line becomes the dark-reference value of the line.

Incidentally, OB pixels generating the horizontal-OB area include the following two types of OB pixels, as disclosed in Japanese Patent Laid-Open No. 2002-64196.

A first OB pixel includes a photoelectric-conversion element such as a photodiode and a layer provided to output a signal generated through the photoelectric-conversion element. The front face of the first OB pixel is optically shielded by using aluminum or the like.

A second OB pixel does not include the photoelectric-conversion element and/or includes the photoelectric-conversion element, but no layer provided to output the signal generated through the photoelectric-conversion element.

Being different from a signal output from the first OB pixel, a signal output from the second OB pixel does not include a dark-current component occurring in the photoelectric-conversion element. Therefore, it becomes possible to estimate the amount of dark current in the environment where photographing is performed by providing both the first and second OB pixels and comparing a signal output from the first OB pixel to that output from the second OB pixel. Further, no defect caused by the dark current is output from the second OB pixel and no noise component is output, the noise component occurring in each pixel. Therefore, a signal output from the second OB pixel can be used to correct another noise component which is not generated from any pixel.

On the other hand, a signal output from the first OB pixel includes the dark current, as is the case with an effective-pixel part receiving light from a subject. Therefore, a signal output from the first OB signal is required, so as to perform vertical-dark-shading correction to absorb the level fluctuation of a dark-current component of a signal output from the effective-pixel part.

However, when a strong noise occurs in any of the first OB pixels during the vertical-dark-shading correction performed by using the signal output from the first OB pixel, the correction precision is significantly affected by the noise. Therefore, under some photographing conditions, it may become difficult to perform the vertical-dark-shading correction with precision and the image quality may be deteriorated.

For example, if a long accumulation time is set for a little amount of incident light, noises included in signals output from the pixels are also increased. Therefore, variations in signals output from the first OB pixels may become significant. That is to say, the output-signal variations between the OB pixels may become significant. In that case, correction data generated from the signals output from the first OB pixels also varies from line to line. As a result, if correction is performed by using the correction data, an output image obtained after the correction may vary from line to line and horizontal stripes may occur on the image.

If photographing is performed under circumstances where much dark current occurs, that is to say, in a high-temperature environment and/or at the long-exposure time, the probability of occurrence of a defective pixel increases, where the defective pixel generates dark current of which amount is larger than that of dark current generated by pixels provided around the defective pixel. If the defective pixel exists, the average value of output signals of the first OB pixel of a line where the defective pixel exists is affected by the defective pixel, and the correction value of the above-described line becomes significantly different from those of other lines. Therefore, if horizontal-dark-shading correction is performed by using the correction data, improper correction is performed only for the line corresponding to the first OB pixel including the defective pixel. As a result, a horizontal line may occur on an image obtained after the correction.

In any case, if a sufficient number of first OB pixels are provided for each line and the number of the first OB pixels is increased, the first OB pixels being used to calculate the average value used to generate the correction data, variations in average values of the first OB pixels provided for each line can be decreased.

However, an unnecessary increase in the size of an area where the first OB pixels are arranged leads to an increase in the chip size so that the cost is increased. Therefore, the size of a horizontal-OB area where the first OB pixels are arranged is limited.

Therefore, if known vertical-dark-shading correction is performed, it is preferable that correction data is smoothed, so as to eliminate the effect of a noise component. However, even though the smoothed correction data does not affect correcting gradual vertical-dark shading, the use of the smoothed correction data makes it difficult to properly correct a vertical-shading component with a high frequency, such as the above-described horizontal stripes.

Thus, there is room for improvements in performing vertical-dark-shading correction with high precision independently of photographing conditions and/or a photographing environment.

SUMMARY OF THE INVENTION

The present invention provides an image-pickup apparatus which allows for increasing the precision of dark-shading correction without increasing the size of an image-pickup element.

According to an aspect of the present invention, an image-pickup apparatus including an image-pickup element including an effective-pixel part provided to receive an optical image of a subject and generate an image signal, and a light-shielding-pixel part including plural pixel parts shielded from light, a signal-processing unit configured to set a reference level of an output signal transmitted from the effective-pixel part, and a control unit configured to switch between at least two areas used to set the reference level, the areas being provided in the light-shielding-pixel part, based on at least one of an accumulation time of the image-pickup element, an ambient temperature of the image-pickup element, and a gain of a signal output from the image-pickup element is provided, where the light-shielding-pixel part includes first and second light-shielding-pixel parts with different configurations, and where the control unit switches between a case where the first light-shielding-pixel part is used and a case where each of the first and second light-shielding-pixel parts is used, as an area used to set the reference level.

Further features and aspects of the present invention will become apparent from the following detailed description of exemplary embodiments with reference to the attached drawings.

BRIEF DESCRIPTION OF THE DRAWINGS

FIG. 7 is a flowchart illustrating an example procedure of vertical dark-shading correction performed according to the second embodiment.

DESCRIPTION OF THE EMBODIMENTS

Various exemplary embodiments, features, and aspects of the invention will be described in detail below with reference to the drawings.

Figure 1:
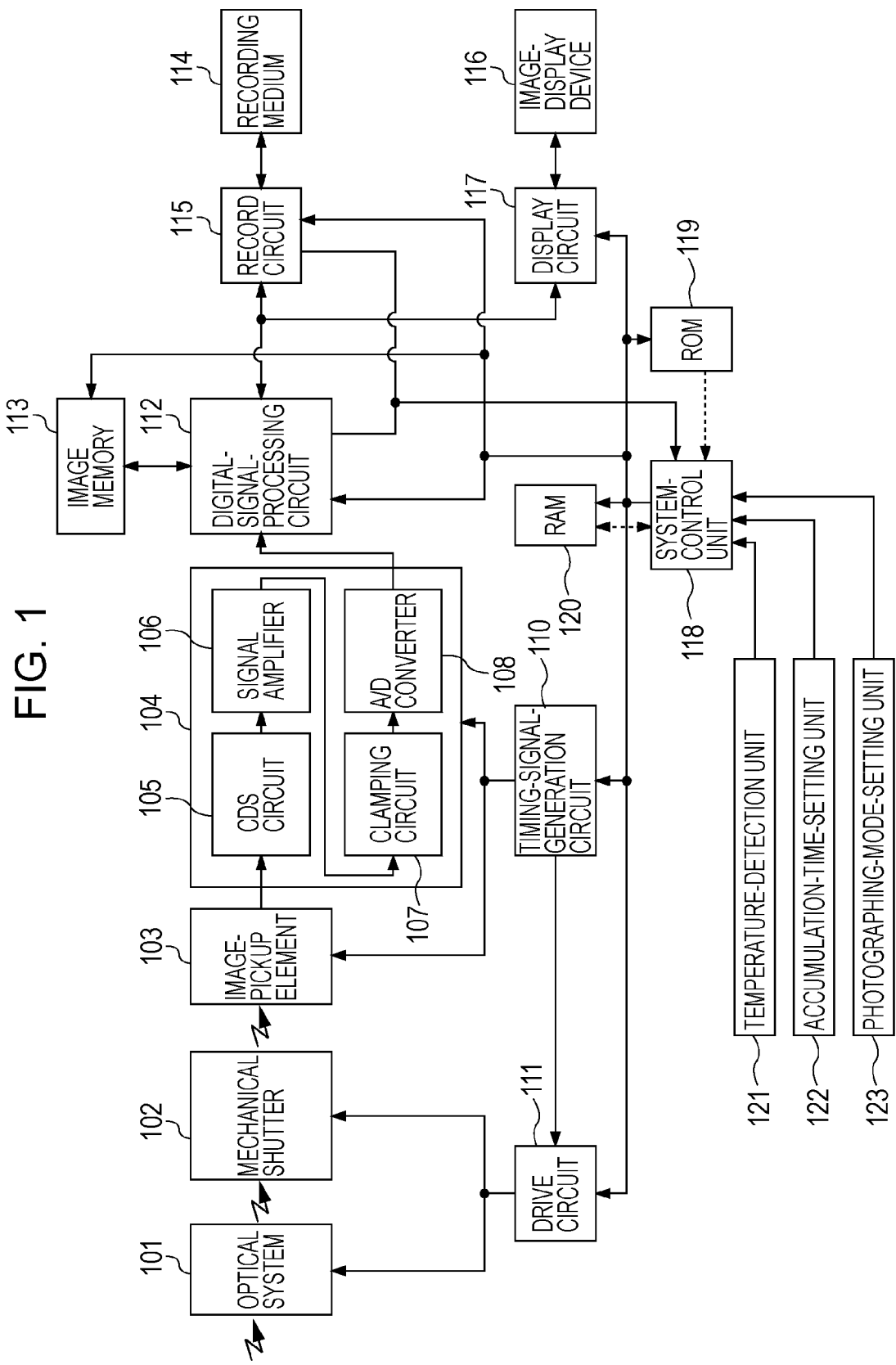
FIG. 1 is a block diagram showing an example configuration of an image-pickup apparatus.

FIG. 1 is a block diagram showing an example configuration of an image-pickup apparatus.

In FIG. 1, an optical system 101 including a lens and an aperture, a mechanical shutter 102, an image-pickup element 103 converting incident light into an electric signal, an analog-signal-processing circuit 104 performing analog-signal processing for an image signal output from the image-pickup element 103, and an CDS circuit 105 performing correlated double sampling in the analog-signal-processing circuit 104 are provided.

Further, a signal amplifier 106 configured to amplify an analog signal in the analog-signal-processing circuit 104, a clamping circuit 107 performing optical-black (OB) clamping, an analog-to-digital (A/D) converter 108 converting an analog signal into a digital signal in the analog-signal-processing circuit 104, and a timing-signal-generation circuit 110 generating a signal making the image-pickup element 103 and the analog-signal-processing circuit 104 operate are provided.

Still further, a drive circuit 111 driving the optical system 101, the mechanical shutter 102, and the image-pickup element 103, a digital-signal-processing circuit 112 performing digital-signal processing necessary for image data obtained through photographing, an image memory 113 storing image data that had been subjected to the signal processing, and a recording medium 114 that can be removed from the image-pickup apparatus are provided.

Still further, a record circuit 115 recording the image data that had been subjected to the signal processing onto the recording medium 114, an image-display device 116 displaying the image data that had been subjected to the signal processing, a display circuit 117 performing control, so as to display an image on the image-display device 116, and a system-control unit 118 controlling the entire image-pickup apparatus are provided. The system-control unit 118 controls an operation of each of the timing-signal-generation circuit 110, the drive circuit 111, the digital-signal-processing circuit 112, the image memory 113, the record circuit 115, the display circuit 117, a nonvolatile memory 119, and a volatile memory 120.

The nonvolatile memory (ROM) 119 is provided to store a program in which a control method performed by the system-control unit 118 is written, parameters used to execute the program, and correction data such as data on the flaw address. The volatile memory 120 is a volatile memory (random-access memory (RAM)) provided to store the program, control data, and the correction data that are stored in the nonvolatile memory 119, as required.

A temperature-detection unit 121 is configured to detect the temperature of the image-pickup element 103 and/or circuits provided therearound. An accumulation-time-setting unit 122 is configured to set the accumulation time of the image-pickup element 103. The system-control unit 118 transmits an instruction to drive the image-pickup element 103 to the timing-signal-generation circuit 110 based on the accumulation time set by the accumulation-time-setting unit 122. A photographing-mode-setting unit 123 is provided to make photographing-condition settings such as ISO-speed-ratings settings, switch between still-image photographing and/or moving-image photographing, etc.

Hereinafter, photographing operations of the above-described image-pickup apparatus will be described. When the power of the image-pickup apparatus is turned on, the system-control unit 118 starts operating, and transfers and/or stores necessary programs, the control data, and the correction data to and/or in the volatile memory 120 from the nonvolatile memory 119. The above-described program and/ or data is used when the system-control unit 118 controls the image-pickup apparatus. Then, an additional program and/or an additional data item is transferred from the nonvolatile memory 119 to the volatile memory 120, and the system-control unit 118 reads and uses data stored in the nonvolatile memory 119, as required.

The optical system 101 forms a subject image of which brightness is adjusted on the image-pickup element 103 by driving the aperture and the lens based on a control signal transmitted from the system-control unit 118.

When a still image is photographed, the mechanical shutter 102 is driven in association with the operation of an electronic shutter of the image-pickup element 103, so as to control the exposure time of the image-pickup element 103. Further, when a moving image is photographed, the mechanical shutter 102 is retained in the open state so that the image-pickup element 103 is always exposed to light during the video shooting.

The image-pickup element 103 is driven by a drive-pulse signal generated from an operation-pulse signal generated by the timing-signal-generation circuit 110. Then, the image-pickup element 103 converts data on a subject image into an electric signal through photoelectric conversion and outputs the electric signal as an analog-image signal.

The CDS circuit 105 eliminates a clock-synchronous noise from the analog-image signal output from the image-pickup element 103 according to the operation pulse generated by the timing-signal-generation circuit 110. The signal amplifier 106 applies a gain with an amplification factor determined based on the incident-light amount to the analog-image signal output from the CDS circuit 105. The clamping circuit 107 clamps the analog-image signal amplified by the signal amplifier 106 by using an output signal of a horizontal-OB area of the image-pickup element 103 as a reference voltage. Then, the A/D converter 108 converts the analog-image signal into a digital-image signal.

Next, the digital-signal-processing circuit 112 generates data on correction of vertical dark shading which occurs due to average processing performed for signals of the horizontal-OB area, the signals being included in the digital-image signal, and performs vertical-shading-correction processing by using the correction data. Further, the digital-signal-processing circuit 112 performs image processing including color conversion, white-balance processing, gamma correction, etc., resolution-conversion processing, image-compression processing, etc. for the digital-image signal. The image memory 113 is used to temporarily store a digital-image signal being subjected to signal processing and store image data which is the digital-image signal that had been subjected to the signal processing, etc.

The image data subjected to the resolution-conversion processing by the digital-signal-processing circuit 112 is converted into a signal ready for the image-display device 116 (e.g., an analog signal generated in the national-television-standards-Committee (NTSC) format or the like) through the display circuit 117 and displayed on the image-display device 116. In another case, image data subjected to the signal processing by the digital-signal-processing circuit 112 and/or image data stored in the image memory 113 is converted into data ready for the recording medium 114 (e.g., file-system data having a hierarchical structure) through the record circuit 115 and recorded onto the recording medium 114.

The system-control unit 118 may not let the digital-signal-processing circuit 112 perform the signal processing but may perform control so that the digital-image signal is output to the image memory 113 and/or the record circuit 115 in its original form, as image data.

Upon receiving a request issued from the system-control unit 118, the digital-signal-processing circuit 112 outputs information including a digital-image signal generated during the signal processing and/or image data to the system-control unit 118. For example, the information includes information about the space frequency of an image, the average value of a specified area, the data amount of a compressed image, etc., or information extracted therefrom. Further, upon receiving a request issued from the system-control unit 118, the record circuit 115 outputs information about the type, the free space, etc. of the recording medium 114 to the system-control unit 118.

Further, reproduction operations performed when image data is recorded onto the recording medium 114 will be described. The record circuit 115 reads the image data from the recording medium 114 based on a control signal transmitted from the system-control unit 118. When the image data is data on a compressed image, the digital-signal-processing circuit 112 performs image-expansion processing based on the control signal transmitted from the system-control unit 118, as is the case with the former description, and stores the image data in the image memory 113. The image data stored in the image memory 113 is subjected to the resolution-conversion processing by the digital-signal-processing circuit 112, converted into a signal ready for the image-display device 116 through the display circuit 117, and displayed on the image-display device 116.

Figure 2:
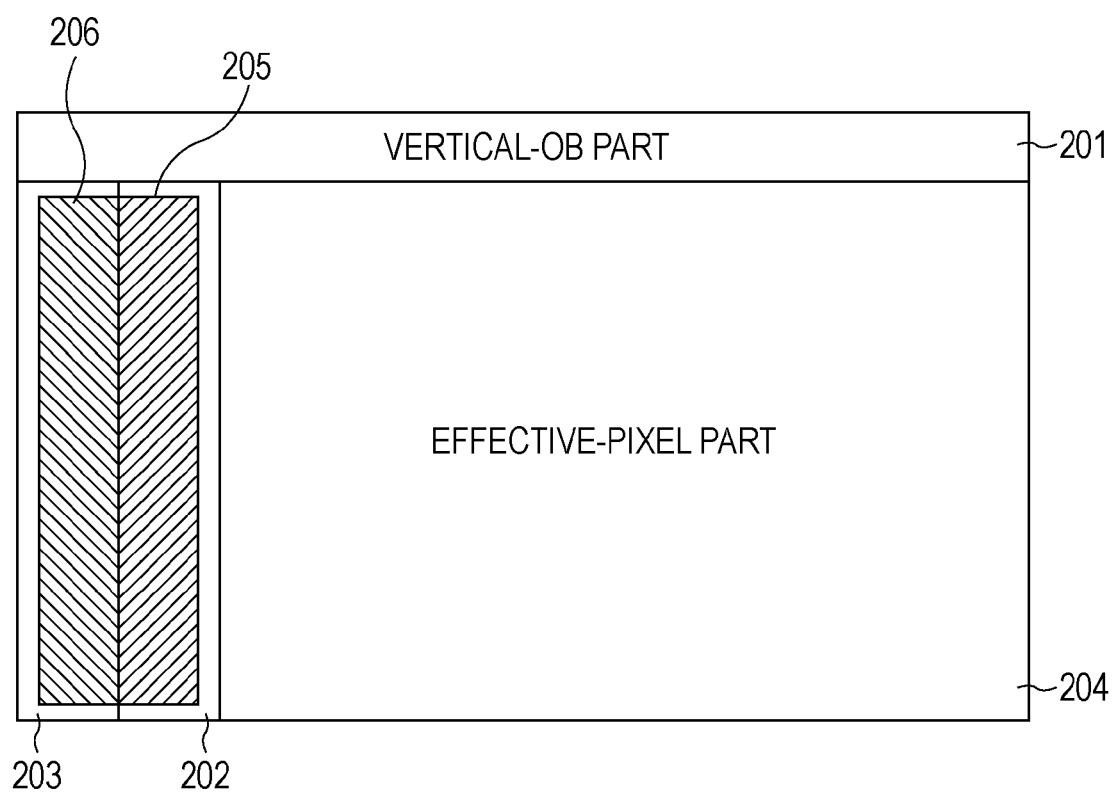
FIG. 2 shows an example configuration of a pixel area of an image-pickup element.

FIG. 2 illustrates an example configuration of a pixel area of the image-pickup element 103.

In FIG. 2, a vertical-OB unit 201, a first horizontal-OB part (first light-shielding-pixel part) 202, and a second horizontal-OB part (second light-shielding-pixel part) 203 are provided. The first horizontal-OB part 202 and the second horizontal-OB part 203 form a horizontal-OB part. Each of the vertical-OB part 201, the first horizontal-OB part 202, and the second horizontal-OB part 203 includes plural pixels, where the front face of each of the pixels is shielded from light by using aluminum or the like. Each of the vertical-OB part 201 and the first horizontal-OB part 202 of the above-described parts includes a first OB pixel including a photoelectric-conversion element such as a photodiode.

On the other hand, the second horizontal-OB part 203 includes at least one pixel including no photoelectric-conversion element such as the photodiode. Or, even though the second OB pixel includes the photoelectric-conversion element, the second OB pixel includes no unit configured to transfer an electric signal generated by the photoelectric-conversion element to an output unit of the image-pickup element. Namely, the second OB pixel includes at least one pixel having a unit provided to prevent a signal generated by the photoelectric-conversion element from being output. An effective-pixel part 204 includes at least one effective pixel that is not shielded from light, and that receives data on the subject image and generates a signal charge. A first calculation area 205 includes part of and/or the entire horizontal-OB part 202. A second calculation area 206 includes part of and/or the entire second horizontal-OB part 203.

First Exemplary Embodiment

Figure 3:
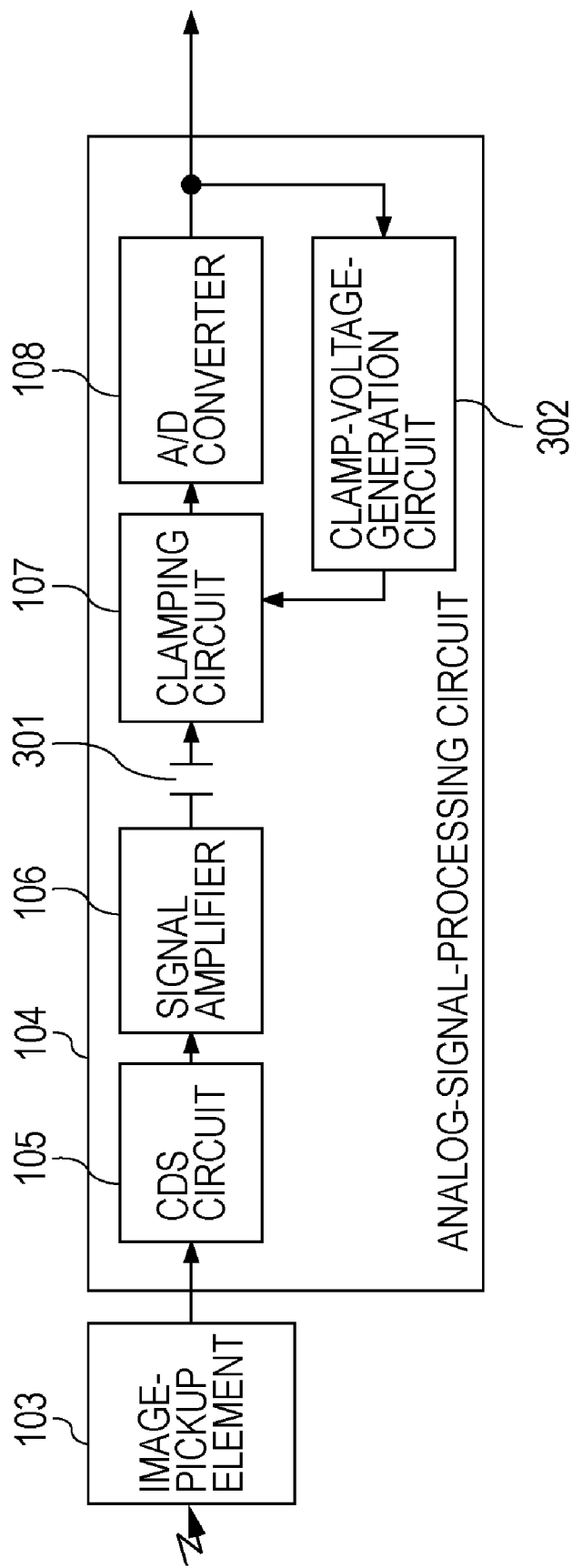
FIG. 3 is a block diagram illustrating an example analog-signal-processing circuit according to a first embodiment of the present invention.

FIG. 3 is a block diagram illustrating the analog-signal-processing circuit 104 according to a first embodiment of the present invention.

In the first embodiment, vertical dark-shading correction is performed by using a horizontal-OB-clamping function of the above-described analog-signal-processing circuit 104.

In FIG. 3, the image-pickup element 103, the analog-signal-processing circuit 104, the CDS circuit 105, the signal amplifier 106, the clamping circuit 107, and the A/D converter 108 are the same as those described with reference to FIG. 1. A capacitor 301 is inserted between the output side of the signal amplifier 106 and the input side of the clamping circuit 107. A clamp-voltage-generation circuit 302 generated based on the feedback system connects the output side of the A/D converter 108 to the clamping circuit 107.

An image signal transmitted from the image-pickup element 103 is transmitted to the analog-signal-processing circuit 104. The CDS circuit 105 samples and holds the image signal transmitted to the analog-signal-processing circuit 104, and the signal amplifier 106 applies a predetermined gain to the image signal. Then, the image signal output from the signal amplifier 106 is made to pass through the capacitor 301 so that the direct-current (DC) component of the image signal is eliminated. Then, the image signal is transmitted to the clamping circuit 107. The clamping circuit 107 performs clamping for the transmitted image signal based on a clamp-control voltage output from the clamp-voltage-generation circuit 302, as a reference voltage.

The clamped analog-image signal is transmitted to the A/D converter 108 and converted into a digital-image signal. The digital-image signal is output, as a signal output from the analog-signal-processing circuit 104, and transmitted to the clamp-voltage-generation circuit 302. The clamp-voltage-generation circuit 302 integrates output signals of the horizontal-OB area, the output signals being included in the digital-image signals, every single line and/or at predetermined intervals, and generates a clamp-control voltage so that the integrated value becomes constant.

Thus, a closed loop is generated among the clamping circuit 107, the A/D converter 108, and the clamp-voltage-generation circuit 302. Then, the clamp-voltage-generation circuit 302 sets a time constant (feedback gain) used at the feedback time and performs feedback control so that the OB level of digital-image signals output from the analog-signal-processing circuit 104 becomes constant.

Figure 5:
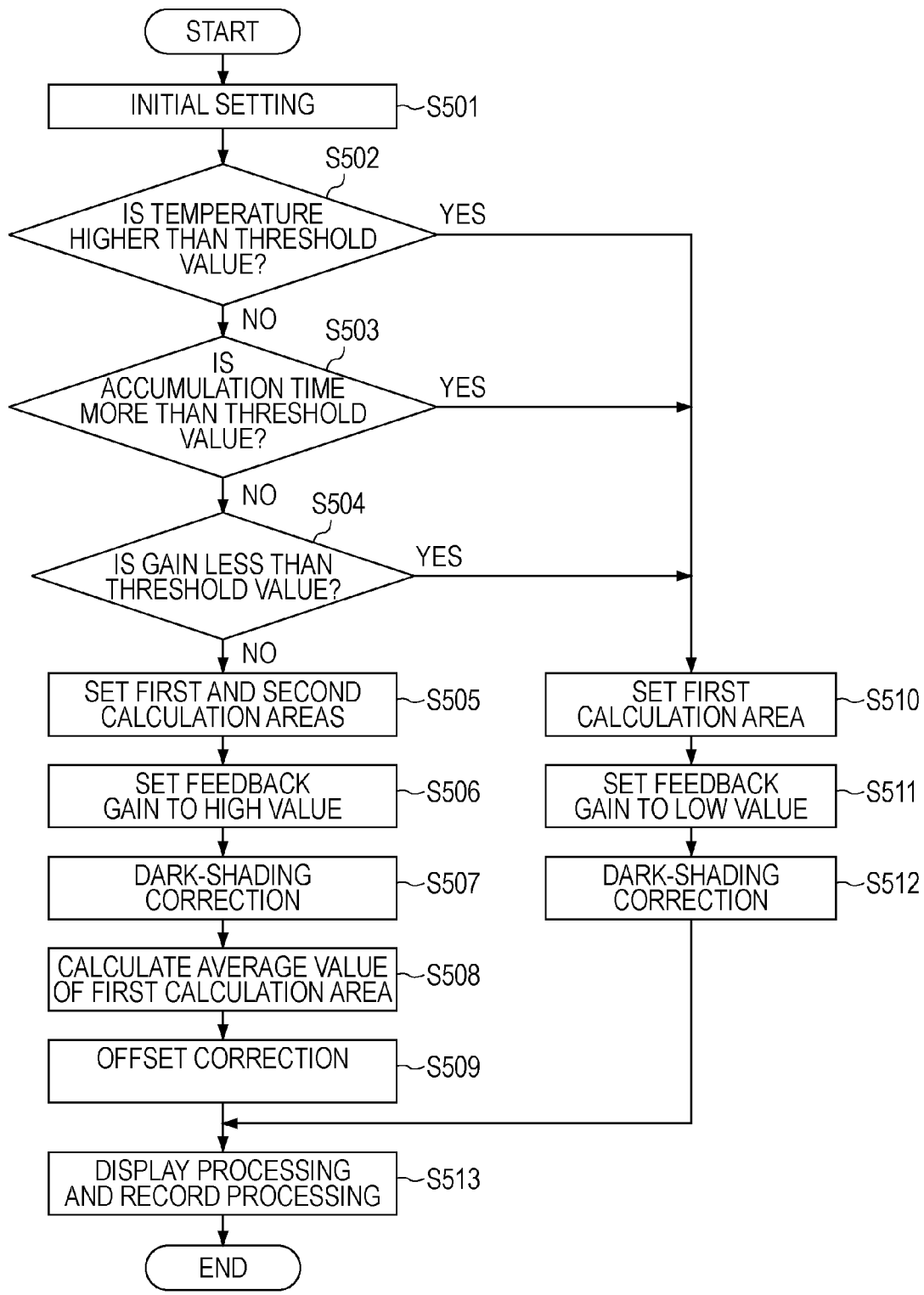
FIG. 5 is a flowchart illustrating an example procedure of vertical dark-shading correction performed according to the first embodiment.

FIG. 5 is a flowchart illustrating an example procedure of vertical dark-shading correction performed according to the first embodiment. When still-image-photographing mode is set, the processing corresponding to step S501 is started.

At step S501, the signal amplifier 106 sets a gain and initial settings are made, the initial settings including photographing conditions such as an aperture value, an exposure time, etc.

At step S502, the system-control unit 118 determines whether or not the temperature of the image-pickup element 103 and/or circuits provided therearound is equivalent to and/or higher than a threshold value, the temperature being detected by the temperature-detection unit 121. If the detected temperature is equivalent to and/or higher than the threshold value, the processing advances to step S510. Otherwise, the processing advances to step S503.

At step S503, it is determined whether or not the value of the accumulation time of the image-pickup element 103 is equivalent to and/or more than a threshold value, the accumulation time being set by the accumulation-time-setting unit 122. If it is determined that the set accumulation-time value is equivalent to and/or more than the threshold value so that long exposure is performed, the processing advances to step S510. Otherwise, the processing advances to step S504.

At step S504, it is determined whether or not the value of a gain set by the signal amplifier 106 is less than a threshold value. If it is determined that the value of the set gain is less than the threshold value, the processing advances to step S510. If it is determined that the value of the set gain is equivalent to and/or more than the threshold value, the processing advances to step S505.

Thus, when the ambient temperature of the image-pickup element 103 is lower than a threshold value and the value of the accumulation time of the image-pickup element 103 is less than the threshold value, it is determined that there is a high possibility that only a small amount of dark current occurs in the effective-pixel part 204. In that case, the processing advances to step S505. Otherwise, it is determined that there is a high possibility that a large amount of dark current occurs in the effective-pixel part 204. In that case, the processing advances to step S510. According to the above-described embodiment, the processing advances to step S510 when any one of the values for determination is more than the threshold value. However, the present invention can be achieved without being limited to the above-described embodiment. Namely, the processing may advance to step S510 when at least two of the values for determination are more than the threshold value. Further, a point may be given to each of the values so that the processing may advance to step S510 when the total of the points is more than the threshold value.

At step S505, the system-control unit 118 determines each of the first calculation area 205 and the second calculation area 206, as an area referred to by the clamp-voltage-generation circuit 302, so as to generate a clamp-control voltage.

If a dark current hardly occurs, there is a small difference between the level of the first calculation area 205 including at least one first OB pixel, where the dark current is included in a signal output from the first OB pixel, and that of the second calculation area 206 including at least one second OB pixel, where no dark current is included in a signal output from the second OB pixel. Therefore, the output signals of both the first and second calculation areas 205 and 206 are integrated every single line and/or at predetermined intervals, and a clamp-control voltage can be generated so that the integral value becomes constant. As a result, the number of pixels of a horizontal-OB area used to generate a clamp voltage can be increased and variations in clamp voltages of each line can be decreased.

At step S506, the system-control unit 118 sets the value of the feedback gain of the clamp-voltage-generation circuit 302 to a value higher than that of a feedback gain set at step S511 that will be described later. This is because it is estimated that the dark current hardly occurs so that a defect caused by the dark current hardly occurs in the horizontal-OB area and there is a low possibility that a horizontal line occurs in an image even though the feedback gain is increased.

Further, as the gain set by the signal amplifier 106 increases, so does the possibility of occurrence of vertical dark shading with a high frequency. Therefore, if it is determined that the gain value is equivalent to and/or more than the threshold value, the processing advances to steps S505 and S506, and the feedback gain is set to a high value.

At step S507, the drive circuit 111 controls the mechanical shutter 102 according to an instruction issued from the system-control unit 118 and the timing-signal-generation circuit 110 performs photographing by controlling the image-pickup element 103. Then, an analog-image signal obtained by the image-pickup element 103 is transmitted to the analog-signal-processing circuit 104. The clamp-voltage-generation circuit 302 of the analog-signal-processing circuit 104 generates a clamp voltage by using an output signal of each of the first calculation area 205 and the second calculation area 206, and corrects a dark-shading component generated in a vertical direction. Then, an image signal that had been subjected to dark-shading correction is converted into a digital-image signal and transmitted to the digital-signal-processing circuit 112.

At step S508, the digital-signal-processing circuit 112 calculates the average value of output signals of the first calculation area 205 of the image-pickup element 103.

At step S509, offset correction is uniformly performed for image signals output from the effective-pixel part so that the average value calculated at step S508 becomes the reference value of a dark level, and the processing advances to step S513.

At step S513, the digital-signal-processing circuit 112 outputs the corrected digital-image signal to each of the image memory 113, the record circuit 115, or the display circuit 117, and performs display processing and/or record processing for data on a photographed image.

On the other hand, at step S510, the system-control unit 118 determines only the first calculation area 205 to be an area referred to by the clamp-voltage-generation circuit 302, so as to generate a clamp-control voltage.

If a dark current of some magnitude occurs, the difference between the level of the first calculation area 205 including the first OB pixels of which output signals include dark currents and that of the second calculation area 206 including the second OB pixels of which output signals include no dark currents is increased. Therefore, as is the case with the first horizontal-OB part 202, when correcting an output signal of the effective-pixel part 204 where the dark current of some magnitude occurs, it is not appropriate to use the output signal of the second horizontal-OB part 203 including no dark current. Therefore, the clamp-voltage-generation circuit 302 should generate a clamp-control voltage by using only the first calculation area 205 of the first horizontal-OB part 202.

At step S511, the system-control unit 118 sets the feedback gain of the clamp-voltage-generation circuit 302 to a value lower than that of the feedback gain set at step S506. The above-described processing is performed so that the clamp-control voltage is not easily affected by a defective pixel caused by the dark current, since it is estimated that a dark current of some magnitude occurs.

At step S512, the drive circuit 111 controls the mechanical shutter 102 according to an instruction issued from the system-control unit 118 and the timing-signal-generation circuit 110 performs photographing by controlling the image-pickup element 103. Then, an analog-image signal obtained by the image-pickup element 103 is transmitted to the analog-signal-processing circuit 104. The clamp-voltage-generation circuit 302 of the analog-signal-processing circuit 104 integrates output signals of only the first calculation area 205 every single line and/or at predetermined intervals, generates a clamp-control voltage so that the integrated value becomes constant, and corrects a dark-shading component generated in a vertical direction. Then, the image signal that had been subjected to the dark-shading correction is converted into a digital-image signal and transmitted to the digital-signal-processing circuit 112. Then, the processing advances to the above-described step S513 so that the display processing and/or the record processing is performed for data on the photographed image.

Thus, according to the first embodiment, the analog-signal-processing circuit 104 switches between horizontal OB areas which are referred to, so as to obtain the clamp-control voltage, according to the temperature of the image-pickup element 103 and/or circuits provided therearound, the accumulation time of the image-pickup element 103, and the gain of the signal amplifier 106.

Although the image-pickup apparatus according to the first embodiment has been described with reference to FIGS. 1 to 5, the present invention can be achieved in various forms without being limited to the first embodiment.

For example, the set value of the feedback gain of the clamp-voltage-generation circuit 302 may be changed according to the size of an area which is referred to, so as to generate the clamp-control voltage. The value of the feedback gain may be increased as the size of the horizontal-OB area is increased, where the horizontal-OB area is referred to, so as to generate the clamp-control voltage. Further, the value of the feedback gain may be decreased as the size of the horizontal-OB area is decreased.

In another case, even though the size of the horizontal-OB area is decreased, the horizontal-OB area being referred to, so as to generate the clamp-control voltage, the value of the feedback gain may be increased if it can be assumed that the gain of the signal amplifier 106 is low and the output signals of the horizontal-OB area are steady.

Second Exemplary Embodiment

Figure 4:
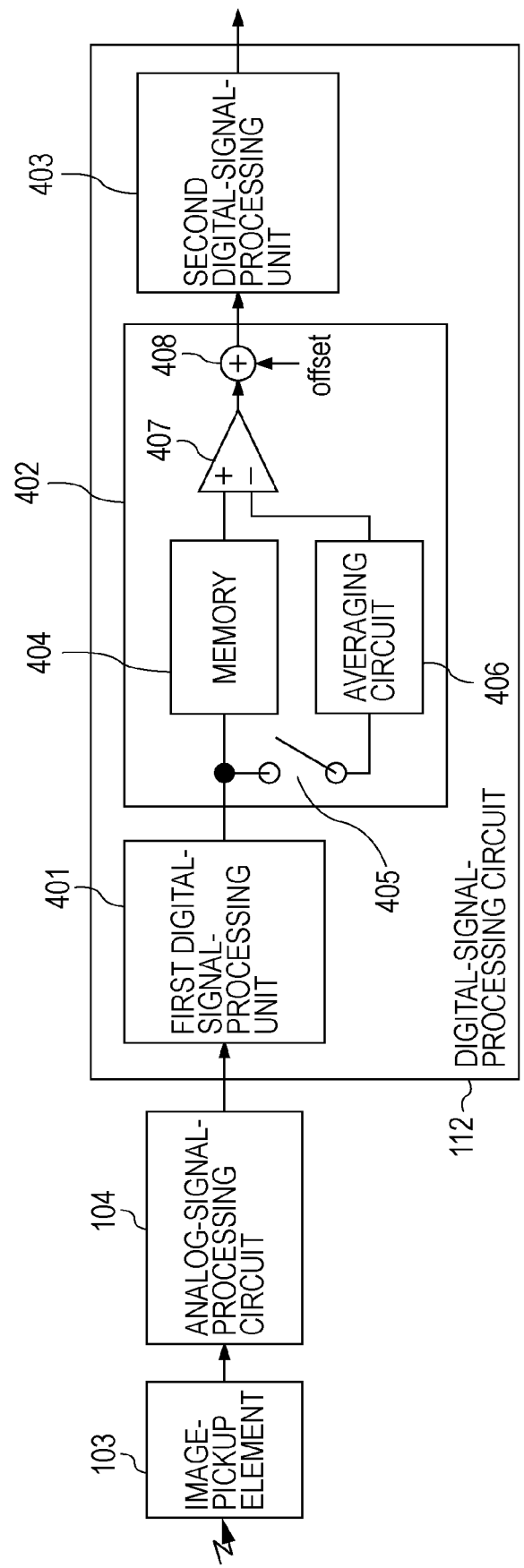
FIG. 4 is a block diagram illustrating an example digital-signal-processing circuit according to a second embodiment of the present invention.

FIG. 4 is a block diagram illustrating an example digital-signal-processing circuit 112 used in a second embodiment of the present invention.

In the second embodiment, a digital-vertical-shading-correction operation and a dark-offset-clamping operation are performed by using the above-described digital-signal-processing circuit 112.

In FIG. 4, the digital-signal-processing circuit 112 includes a first digital-signal-processing unit 401, a dark-offset-clamping circuit 402, and a second digital-signal-processing unit 403.

The first digital-signal-processing unit 401 performs correction including various types of shading corrections, etc. for an image signal output from the analog-signal-processing circuit 104.

The dark-offset-clamping circuit 402 performs offset correction for an image signal output from the first digital-signal-processing unit 401, so as to correct the dark level. The dark-offset-clamping circuit 402 includes a memory 404 and a switch 405 that are connected in parallel to the output side of the first digital-signal-processing circuit 401. The dark-offset-clamping circuit 402 further includes an averaging circuit 406 connected to the first digital-signal-processing unit 401 via the switch 405. Still further, the dark-offset-clamping circuit 402 includes a subtracter 407 connected to the output side of each of the memory 404 and the averaging circuit 406, and an adder 408 connected to the output side of the subtracter 407.

The second digital-signal-processing unit 403 performs gamma processing, white-balance processing, etc. for an image signal output from the adder 408 of the dark-offset-clamping circuit 402.

First, a digital-image signal output from the analog-signal-processing circuit 104 is transmitted to the first digital-signal-processing unit 401. The first digital-signal-processing unit 401 performs various types of corrections including the horizontal-shading correction, the vertical-dark-shading correction, etc. for the digital-image signal transmitted thereto.

Specifically, the vertical-dark-shading correction is performed as below. The digital-image signals output from the analog-signal-processing circuit 104 are transmitted to the first digital-signal-processing unit 401 on a line-by-line basis. The first digital-signal-processing unit 401 calculates the average value of output signals of the horizontal-OB area, the output signals being included in the digital-image signals of each line, and determines data on smoothed average values to be correction data used to perform the vertical-shading correction, as required.

Then, the correction data corresponding to each line is subtracted from the image signal transmitted from the effective-pixel part 204 of each line. The vertical-dark-shading correction is completed by performing the same correction for each line.

An image signal output from the first digital-signal-processing unit 401 is further transmitted to the dark-offset-clamping circuit 402. The dark-offset-clamping circuit 402 performs offset correction of the dark level for the image signal. First, the memory 404 stores an image signal of the effective-pixel part 204, the image signal being transmitted from the first digital-signal-processing unit 401.

While the output signals of the first calculation area 205 are read, the dark-offset-clamping circuit 402 keeps the switch 405 in an ON state and transmits the above-described output signals to the averaging circuit 406. The averaging circuit 406 calculates the average value of the output signals of the first calculation area 205. Data on the calculated average value is transmitted to the subtractor 407, so as to be subtracted from the value of an image signal output from the memory 404. Then, the image signal from which the average value of the first calculation area 205 is subtracted is transmitted to the adder 408 where a predetermined offset value is added. Accordingly, DC components of image signals of the entire effective-pixel part 204 are determined based on the average value of the output signals of the first calculation area 205.

An image signal output from the dark-offset-clamping circuit 402 is transmitted to the second digital-signal-processing unit 403. The second digital-signal-processing unit 403 performs so-called development processing including the gamma processing, the white-balance processing, etc. for the image signal.

Here, the second digital-processing unit 403 may perform the digital-vertical-shading correction in place of the first digital-signal-processing unit 401. When the second digital-signal-processing unit 403 performs the digital-vertical-shading correction, data on image signals of the entire pixel area of the image-pickup element 103 is stored in a memory circuit (not shown) of the second digital-signal-processing unit 403. Then, the second digital-signal-processing unit 403 extracts data on image signals of a horizontal-OB part, the image signals being included in the above-described image signals, calculates vertical projection data of the extracted image signals, and determines the calculated vertical projection data to be correction data.

FIG. 7 is a flowchart illustrating an example procedure of the vertical dark-shading correction performed according to the second embodiment. When the still-image-photographing mode is set, the processing corresponding to step S701 is started.

At step S701, the signal amplifier 106 sets a gain and initial settings are made, the initial settings including photographing conditions such as an aperture value, an exposure time, etc.

At step S702, the drive circuit 111 controls the mechanical shutter 102 based on an instruction issued from the system-control unit 118, and the timing-signal-generation circuit 110 performs photographing by controlling the image-pickup element 103.

At step S703, the system-control unit 118 determines whether or not the temperature of the image-pickup element 103 and/or circuits provided therearound is equivalent to and/or higher than a threshold value, the temperature being detected by the temperature-detection unit 121. If the value of the detected temperature is equivalent to and/or higher than the threshold value, the processing advances to step S710. If the value of the detected temperature is lower than the threshold value, the processing advances to step S704.

At step S704, it is determined whether or not the value of the accumulation time of the image-pickup element 103 is equivalent to and/or more than a threshold value, the accumulation time being set by the accumulation-time-setting unit 122. If it is determined that the set accumulation-time value is more than the threshold value so that the long exposure is performed, the processing advances to step S710. Otherwise, the processing advances to step S705.

At step S705, it is determined whether or not the value of the gain set by the signal amplifier 106 is less than a threshold value. If it is determined that the value of the set gain is less than the threshold value, the processing advances to step S710. If it is determined that the value of the set gain is equivalent to and/or more than the threshold value, the processing advances to step S706.

Thus, when the value of the ambient temperature of the image-pickup element 103 and/or the circuits provided therearound is less than the threshold value and the value of the accumulation time of the image-pickup element 103 is less than the threshold value, it is determined that there is a high possibility that only a small amount of dark current occurs in the effective-pixel part 204. In that case, the processing advances to step S706. Otherwise, it is determined that there is a high possibility that a large amount of dark current occurs in the effective-pixel part 204. In that case, the processing advances to step S710. According to the above-described embodiment, the processing advances to step S710 when any one of the values for determination is more than the threshold value. However, the present invention can be achieved without being limited to the above-described embodiment. Namely, the processing may advance to step S710 when at least two of the values for determination are more than the threshold value. Further, a point may be given to each of the values so that the processing advances to step S710 when the total of the points is more than the threshold value.

At step S706, the system-control unit 118 determines each of the first calculation area 205 and the second calculation area 206 to be an area referred to by the first digital-signal-processing unit 401, so as to calculate the average value of output signals of the horizontal-OB area. The first digital-signal-processing unit 401 calculates the average value of output signals of the first and second calculation areas 205 and 206, the output signals being included in digital-image signals of each line, and determines data on the average value to be correction data.

If a dark current hardly occurs, it becomes possible to decrease the difference between the level of the first calculation area 205 including at least one first OB pixel, where a dark current is included in a signal output from the first OB pixel, and that of the second calculation area 206 including at least one second OB pixel, where no dark current is included in a signal output from the second OB pixel. Therefore, the correction data can be generated by using the average value of output signals of both the first and second calculation areas 205 and 206. As a result, the number of pixels of the horizontal-OB area used to generate the correction data can be increased and variations in the correction data generated for each line can be decreased. Further, vertical shading with a high frequency can also be corrected by performing no correction-data smoothing at step S712 that will be described later.

Further, as the gain set by the signal amplifier 106 increases, so does the possibility of occurrence of the vertical dark shading with a high frequency. Therefore, if it is determined that the gain value is equivalent to and/or more than the threshold value at step S705, the processing advances to step S706 and correction data is generated without performing the correction-data smoothing at step S712 that will be described later.

At step S707, the first digital-signal-processing unit 401 subtracts the correction data from the image signal output from the effective-pixel part 204 and performs the vertical dark-shading correction.

At step S708, the averaging circuit 406 of the dark-offset-clamping circuit 402 calculates the average value of the output signals of the first calculation area 205.

At step S709, the subtractor 407 of the dark-offset-clamping circuit 402 subtracts the average value calculated at step S709 from the image signal and the adder 408 adds a predetermined offset value to the image signal. The reason why the clamping is performed at step S709 is described as below. Namely, since the correction data subtracted from the image data at step S706 includes output signals including no dark currents, the output signals being transmitted from the second calculation area 205, compensation should be made for the dark currents.

At step S715, the second digital-signal-processing unit 403 generates image data by performing the gamma processing, the white-balance processing, etc. for the image signal, transmits the image data to the image memory 113, the record circuit 115, or the display circuit 117, and performs the display processing and/or the record processing for data on a photographed image.

On the other hand, at step S710, the system-control unit 118 determines only the first calculation area 205 to be an area referred to by the first digital-signal-processing unit 401, so as to calculate the average value of output signals of the horizontal-OB area. The first digital-signal-processing unit 401 calculates the average value of the output signals of the first calculation area 205, the output signals being included in digital-image signal of each line, and determines data on the average value to be correction data.

If a dark current of some magnitude may occur, the difference between the level of the first calculation area 205 including the first OB pixels of which output signals include dark currents and that of the second calculation area 206 including the second OB pixels of which output signals include no dark currents is increased. Therefore, as is the case with the first horizontal-OB part 202, when correcting an output signal of the effective-pixel part 204 where the dark current of some magnitude occurs, it is not appropriate to use the output signal of the second horizontal-OB part 203 including no dark current. Therefore, the first digital-signal-processing unit should generate the correction data by using only the first calculation area 205 of the first horizontal-OB part 202.

At step S711, the system-control unit 118 determines whether or not the accumulation time of the image-pickup element 103 is equivalent to and/or more than the threshold value, the accumulation time being required when the image signal is generated. If the accumulation time is equivalent to and/or more than the threshold value, the processing advances to step S712. Otherwise, the processing advances to step S714.

At step S712, the first digital-signal-processing unit 401 smoothes the correction data by averaging the correction data corresponding to plural lines. When the accumulation time of the image-pickup element 103 is long, the possibility of occurrence of a defective pixel caused by a dark current is increased. Therefore, the correction data is smoothed by using the correction data corresponding to the plural lines so that data on only a line where the defective pixel occurs is prevented from being overly corrected.

FIGS. 6A, 6B, 6C, and 6D are provided to exemplarily illustrate how the correction data is smoothed.

Figure 6D:
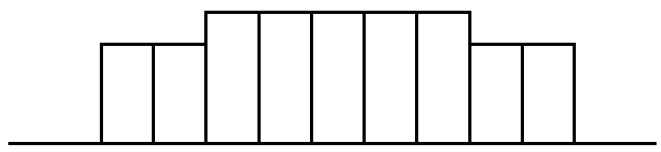
FIG. 6D is also an example of how the correction data is smoothed according to the second embodiment.
Figure 6C:
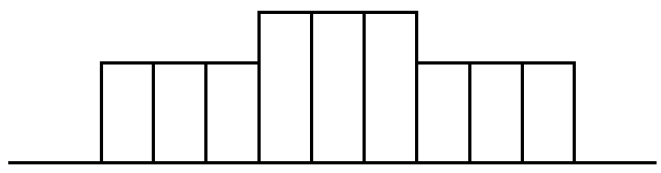
FIG. 6C is an example of how the correction data is smoothed according to the second embodiment.
Figure 6B:
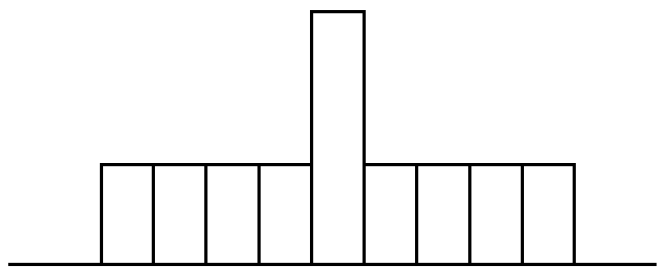
FIG. 6B is also provided to exemplarily describe how the correction data is smoothed according to the second embodiment.
Figure 6A:
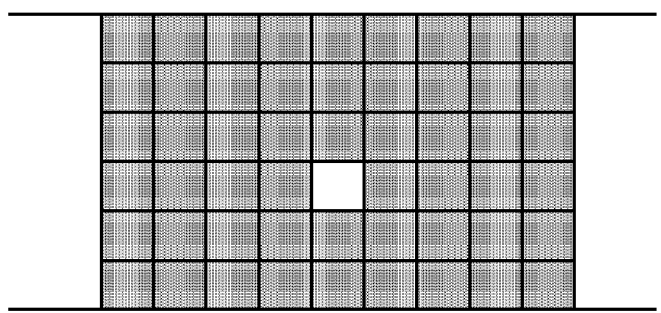
FIG. 6A is an example of how correction data is smoothed according to the second embodiment.

FIG. 6A schematically shows the configuration of a pixel area of the horizontal-OB part. In FIG. 6A, for the sake of simplicity, a calculation area includes only a single defective pixel of which output is larger than those of pixels provided around the defective pixel. Further, each of output signals of the other pixels includes no noise component and the values of the output signals are uniform.

FIG. 6B shows vertical-projection data generated from the horizontal-OB part shown in FIG. 6A and includes average-output values of pixels of each line. As is clear from FIG. 6B, the value of only the vertical-projection data corresponding to the line including the defective pixel is larger than those of the vertical-projection data corresponding to other lines. If the vertical-projection data of the larger value is used, as it is, for the vertical-shading correction, correction appropriate for a value larger than a proper value for correction is performed for the line including the defective pixel. As a result, the horizontal line corresponding to a value smaller than a proper value occurs in an image obtained after the correction.

Each of FIGS. 6C and 6D shows a result of smoothing the vertical-projection data shown in FIG. 6B. The vertical-projection data shown in FIG. 6C is smoothed by averaging the values of three lines including the line for correction and two lines straddling the line for correction. Further, the vertical-projection data shown in FIG. 6D is smoothed by averaging the values of five lines including the line for correction and four lines straddling the line for correction. More specifically, two lines of the four lines are provided on one side of the line for correction and the other two lines are provided on the other side of the line for correction. In each of FIGS. 6C and 6D, the impact of the defective pixel on the vertical-projection data becomes insignificant. Further, the defective-pixel impact becomes more insignificant as the number of lines used to smooth the vertical-projection data increases. The above-described smoothing is performed for the correction data corresponding to each line.

However, if the number of lines used to perform the above-described smoothing is unnecessarily increased, it becomes difficult to correct vertical shading with a high frequency, the vertical shading occurring at intervals closer than those between the number of lines used to perform the above-described smoothing, such as closely generated horizontal stripes.

Therefore, it becomes possible to achieve the vertical-shading correction with increased efficiency by changing the degree of the smoothing according to the photographing conditions, such as increasing the number of lines used to perform the smoothing only at the high-temperature time and/or the long-exposure time where a significant defect easily occurs.

Referring now back to FIG. 7, at step S713, the first digital-signal-processing unit 401 multiplies the averaged correction data by a predetermined coefficient so that new correction data is obtained.

At step S714, the first digital-signal-processing unit 401 performs the dark-shading correction by subtracting the correction data obtained at step S711 and/or step S713 from the image signal output from the effective-pixel part 204. Since the dark-shading correction performed at step S714 uses no output signals of the second calculation area 206, the output signals including no dark currents, the offset correction performed at step S709 may not be performed. Therefore, after the dark-shading correction is performed at step S714, the processing advances to step S715.

Thus, according to the second embodiment, the first digital-signal-processing unit 401 switches between the horizontal-OB areas that are referred to, so as to calculate the correction value of the dark shading, according to the temperature of the image-pickup element 103 and/or the circuits provided therearound, the accumulation time of the image-pickup element 103, and the gain of the signal amplifier 106.

Further, even though the smoothing is not performed for the correction data calculated at step S706 in the second embodiment, the smoothing may be performed. However, for correcting vertical shading with a high frequency, the number of lines of the correction data used for performing the smoothing should be smaller than that of the lines used at step S712.

Further, according to each of the first and second embodiments, the horizontal-OB area referred to is determined based on the temperature of the image-pickup element 103 and/or the circuits provided therearound, the accumulation time of the image-pickup element 103, and the gain value of the signal amplifier 106. However, the present invention can be achieved without being limited to the above-described embodiments. For example, if it can be estimated that the dark current of the image-pickup element 103 is increased due to other factors, for example, as in the case where a liquid-crystal monitor provided in the image-pickup apparatus is used for a long time, it becomes possible to switch between the horizontal-OB areas used to perform the dark-shading correction according to the above-described factors.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-207812 filed on Aug. 9, 2007 and No. 2008-175915 filed on Jul. 4, 2008, which are hereby incorporated by reference herein in their entirety.

What is claimed is:

1. An image-pickup apparatus comprising:
    an image-pickup element including an effective-pixel part provided to receive an optical image of a subject and generate an image signal, and a light-shielding-pixel part including plural pixel parts shielded from light;
    a signal-processing unit configured to set a reference level of an output signal transmitted from the effective-pixel part; and
    a control unit configured to switch between at least two areas used to set the reference level, the areas being provided in the light-shielding-pixel part, based on at least one of an accumulation time of the image-pickup element, an ambient temperature of the image-pickup element, and a gain of a signal output from the image-pickup element,
    wherein the light-shielding-pixel part includes first and second light-shielding-pixel parts with different configurations, and
    wherein the control unit switches between a case where the first light-shielding-pixel part is used and a case where both of the first and second light-shielding-pixel parts are used, as an area used to set the reference level.

2. The image-pickup apparatus according to claim 1, wherein, of the first and second light-shielding-pixel parts, only the first light-shielding-pixel part includes at least one photoelectric-conversion element.

3. The image-pickup apparatus according to claim 1, wherein each of the first and second light-shielding-pixel parts includes at least one photoelectric-conversion element, and
    wherein, of the first and second light-shielding-pixel parts, only the first light-shielding-pixel part includes at least one layer provided to output an electric charge generated by the photoelectric-conversion element.

4. The image-pickup apparatus according to claim 2,
    wherein when the accumulation time of the image-pickup element is less than a threshold value, the control unit sets the reference level by using an output signal of both of the first and second light-shielding-pixel parts, and
    wherein when the accumulation time of the image-pickup element is at least equivalent to or more than the threshold value, the control unit sets the reference level by using the output signal of only the first light-shielding-pixel part.

5. The image-pickup apparatus according to claim 2,
    wherein when the ambient temperature of the image-pickup element is lower than a threshold value, the control unit sets the reference level by using an output signal of both of the first and second light-shielding-pixel parts, and
    wherein when the ambient temperature of the image-pickup element is at least equivalent to or higher than the threshold value, the control unit sets the reference level by using the output signal of only the first light-shielding-pixel part.

6. The image-pickup apparatus according to claim 2,
    wherein when the gain of the output signal of the image-pickup element is at least equivalent to or more than a threshold value, the control unit sets the reference level by using an output signal of both of the first and second light-shielding-pixel parts, and
    wherein when the gain of the output signal of the image-pickup element is less than the accumulation threshold value, the control unit sets the reference level by using the output signal of only the first light-shielding-pixel part.

7. The image-pickup apparatus according to claim 3,
    wherein when the accumulation time of the image-pickup element is less than a threshold value, the control unit sets the reference level by using an output signal of both of the first and second light-shielding-pixel parts, and
    wherein when the accumulation time of the image-pickup element is at least equivalent to or more than the threshold value, the control unit sets the reference level by using the output signal of only the first light-shielding-pixel part.

8. The image-pickup apparatus according to claim 3,
    wherein when the ambient temperature of the image-pickup element is lower than a threshold value, the control unit sets the reference level by using an output signal of both of the first and second light-shielding-pixel parts, and
    wherein when the ambient temperature of the image-pickup element is at least equivalent to or higher than the threshold value, the control unit sets the reference level by using the output signal of only the first light-shielding-pixel part.

9. The image-pickup apparatus according to claim 3,
    wherein when the gain of the output signal of the image-pickup element is at least equivalent to or more than a threshold value, the control unit sets the reference level by using an output signal of both of the first and second light-shielding-pixel parts, and wherein when the gain of the output signal of the image-pickup element is less than the threshold value, the control unit sets the reference level by using the output signal of only the first light-shielding-pixel part.

10. The image-pickup apparatus according to claim 1, wherein the signal-processing unit includes a clamping circuit formed based on a feedback system, the clamping circuit being configured to adjust the reference level of the output signal of the effective-pixel part based on a signal of the light-shielding-pixel part, and
wherein the signal-processing unit changes a feedback gain based on at least one of the accumulation time of the image-pickup element, the ambient temperature of the image-pickup element, and the gain of the signal output from the image-pickup element.

11. The image-pickup apparatus according to claim 10, wherein when the accumulation time of the image-pickup element is less than a threshold value, the clamping circuit sets the feedback gain to a value higher than a value obtained when the accumulation time is equivalent to and/or more than the threshold value.

12. The image-pickup apparatus according to claim 10, wherein when the ambient temperature of the image-pickup element is lower than a threshold value, the clamping circuit sets the feedback gain to a value higher than a value obtained when the ambient temperature is at least equivalent to or higher than the threshold value.

13. The image-pickup apparatus according to claim 10, wherein when the gain of the signal output from the image-pickup element is at least equivalent to or more than a threshold value, the clamping circuit sets the feedback gain to a value higher than a value obtained when the gain of the signal output from the image-pickup element is less than the threshold value.

14. The image-pickup apparatus according to claim 1, wherein the signal-processing unit calculates a reference level of a signal of the effective-pixel part for each line of the image-pickup element, and
wherein the signal-processing unit determines whether or not the reference level is smoothed based on at least one of the accumulation time of the image-pickup element, the ambient temperature of the image-pickup element, and the gain of the signal output from the image-pickup element.

15. The image-pickup apparatus according to claim 14, wherein the signal-processing unit does not smooth the reference level when the accumulation time of the image-pickup element is less than a threshold value, and wherein the signal-processing unit smoothes the reference level when the accumulation time is equivalent to and/or more than the threshold value.

16. The image-pickup apparatus according to claim 14, wherein the signal-processing unit does not smooth the reference level when the ambient temperature of the image-pickup element is lower than a threshold value, and wherein the signal-processing unit smoothes the reference level when the ambient temperature is at least equivalent to or higher than the threshold value.

17. The image-pickup apparatus according to claim 14, wherein the signal-processing unit does not smooth the reference level when the gain of the output signal of the image-pickup element is at least equivalent to or more than a threshold value, and wherein the signal-processing unit smoothes the reference level when the gain of the output signal of the image-pickup element is less than the threshold value.

18. An image-pickup apparatus comprising:
an image-pickup element including an effective-pixel part provided to receive an optical image of a subject and generate an image signal, a first light-shielding-pixel part which is shielded from light, and a second light-shielding-pixel part which is shielded from light;
a signal-processing unit configured to set a reference level of an output signal transmitted from the effective-pixel part; and
a control unit configured to switch between a case where one of the first and second light-shielding-pixel part is used to set the reference level and a case where both of the first and second light-shielding-pixel parts are used to set the reference level based on at least one of an accumulation time of the image-pickup element, an ambient temperature of the image-pickup element, and a gain of a signal output from the image-pickup element,
wherein one of the first and second light-shielding-pixel parts includes at least one photoelectric-conversion element, and the other of the first and second light-shielding-pixel parts does not include the photoelectric-conversion element.

19. The image-pickup apparatus according to claim 18, wherein the signal-processing unit includes a clamping circuit formed based on a feedback system, the clamping circuit being configured to adjust the reference level of the output signal of the effective-pixel part based on a signal of the light-shielding-pixel part, and
wherein the signal-processing unit changes a feedback gain based on at least one of the accumulation time of the image-pickup element, the ambient temperature of the image-pickup element, and the gain of the signal output from the image-pickup element.

20. The image-pickup apparatus according to claim 18, wherein the signal-processing unit calculates a reference level of a signal of the effective-pixel part for each line of the image-pickup element, and
wherein the signal-processing unit determines whether or not the reference level is smoothed based on at least one of the accumulation time of the image-pickup element, the ambient temperature of the image-pickup element, and the gain of the signal output from the image-pickup element.

* * * * *